Jan. 3, 1956     H. V. SCHWEITZER ET AL     2,729,189
BODY PAINTING MACHINE
Filed Oct. 28, 1950     10 Sheets-Sheet 1

INVENTORS
HOWARD V. SCHWEITZER &
WILLIAM C. ALBERTSON, JR.
BY
Ely & Frye
ATTORNEYS Jan. 3, 1956 H. V. SCHWEITZER ET AL 2,729,189
BODY PAINTING MACHINE
Filed Oct. 28, 1950 10 Sheets-Sheet 4

INVENTORS
HOWARD V. SCHWEITZER &
WILLIAM C. ALBERTSON, JR.
BY
Ely & Frye
ATTORNEYS Jan. 3, 1956 H. V. SCHWEITZER ET AL 2,729,189
BODY PAINTING MACHINE
Filed Oct. 28, 1950 10 Sheets-Sheet 5
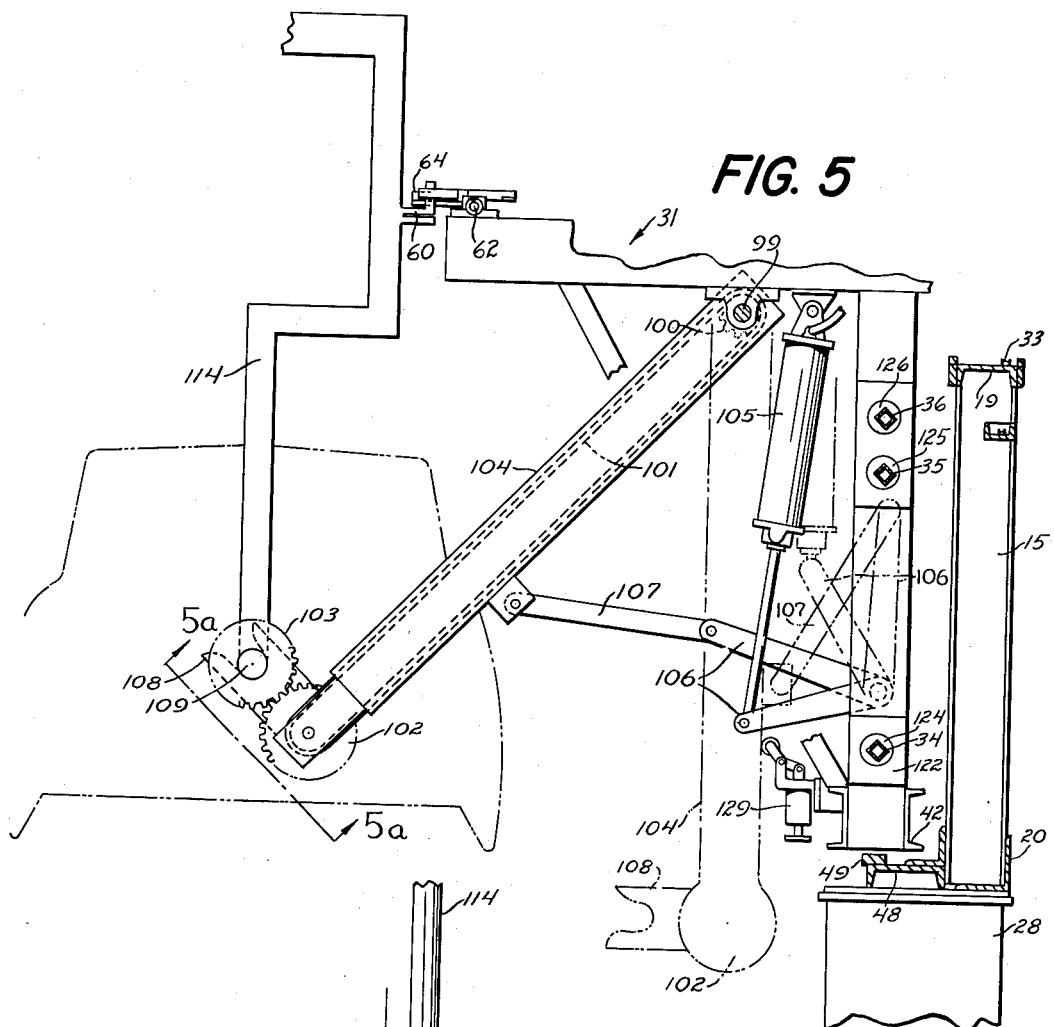
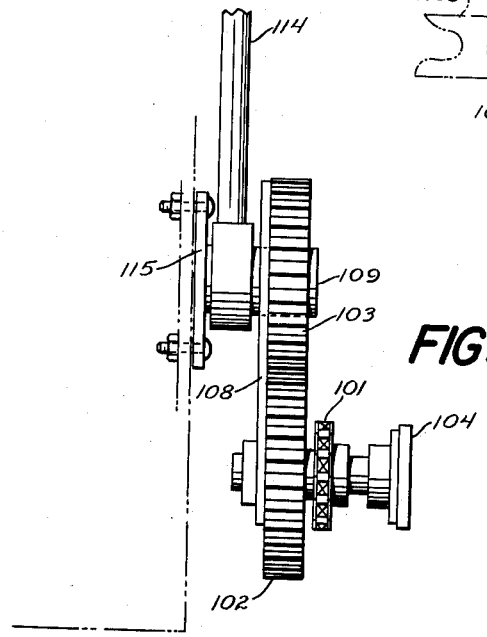
INVENTORS
HOWARD V. SCHWEITZER
WILLIAM C. ALBERTSON, JR.
BY Ely & Frye
ATTORNEYS

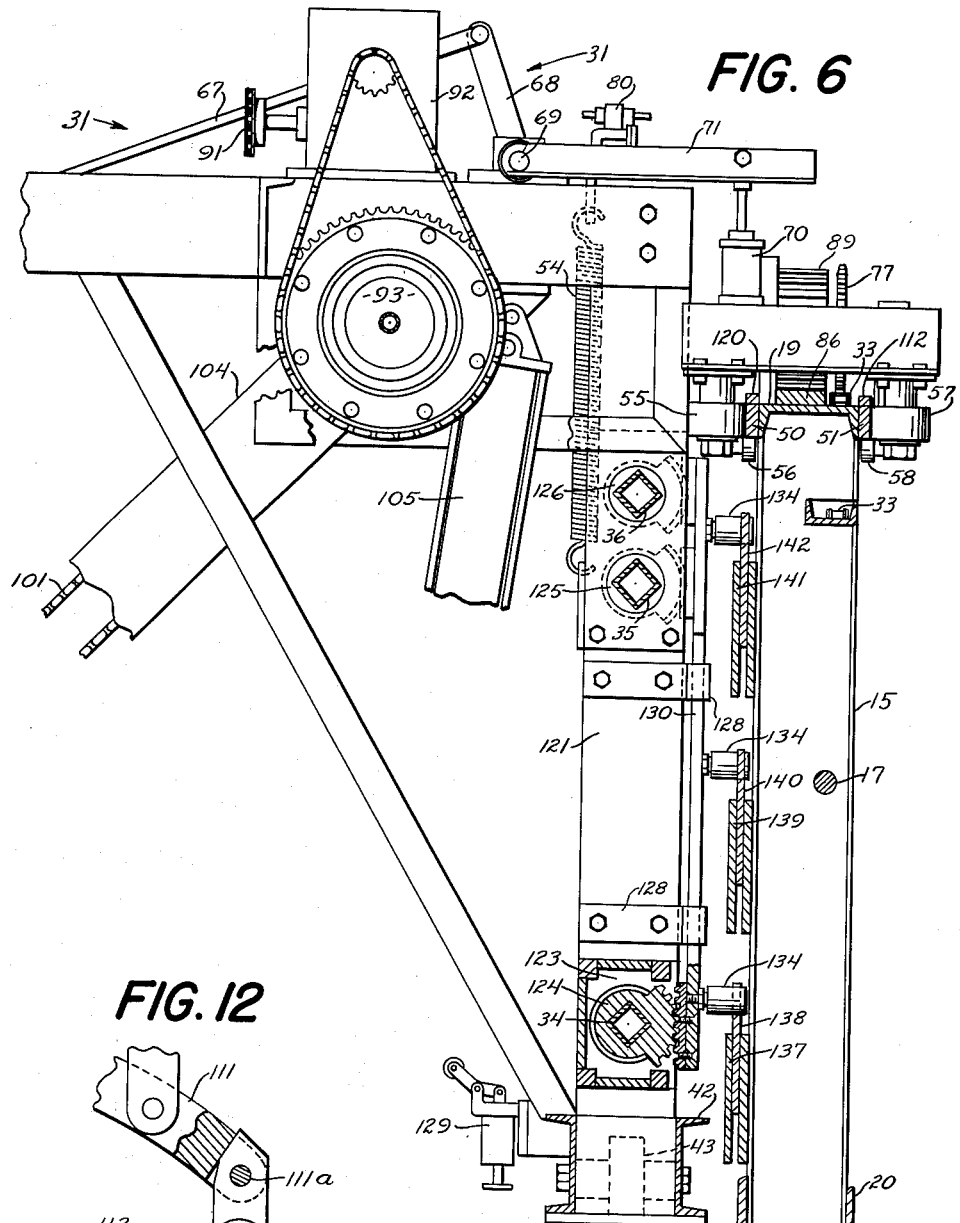
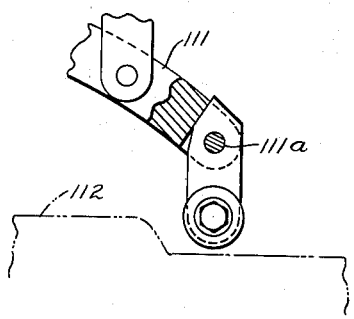

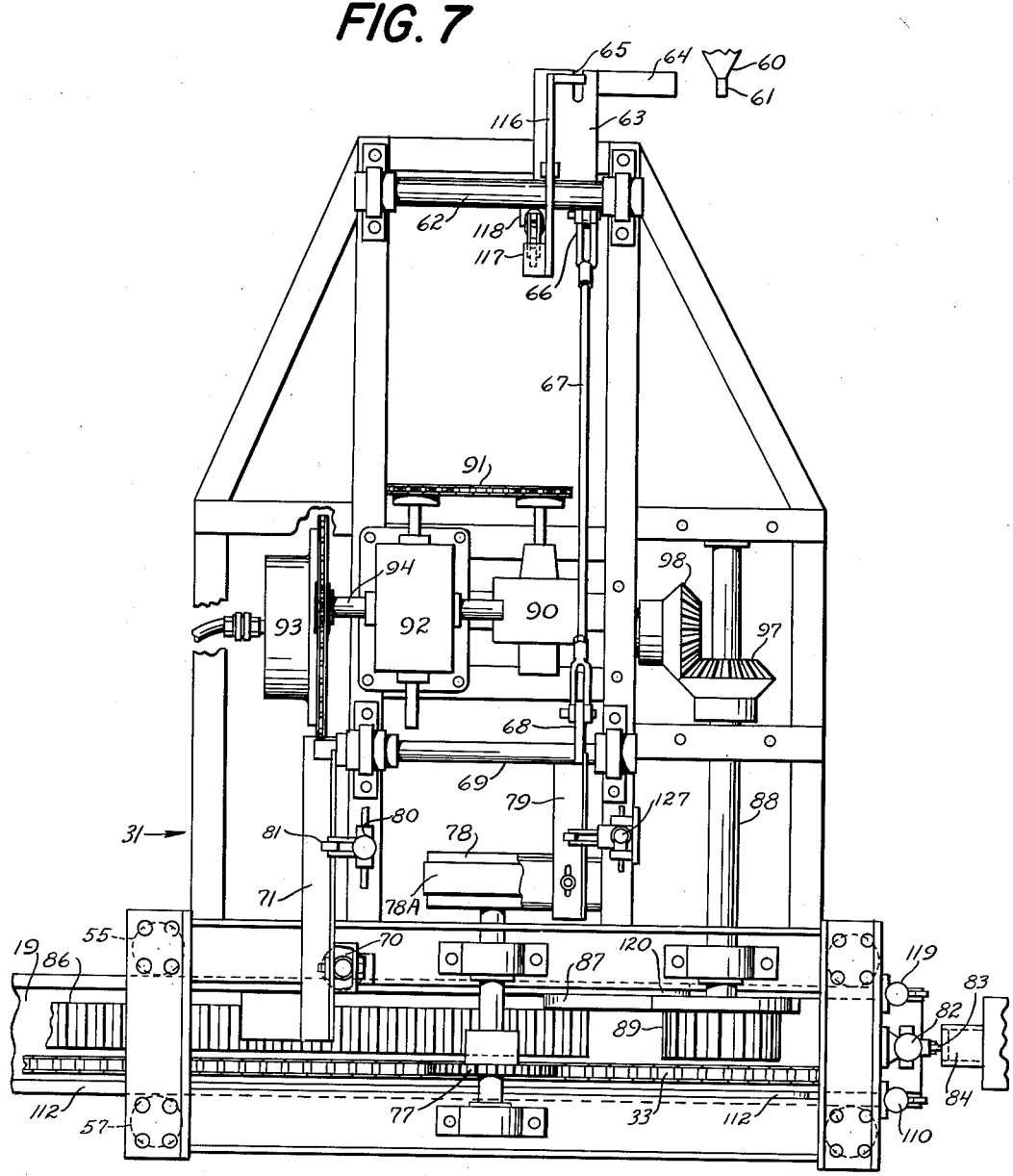

Jan. 3, 1956          H. V. SCHWEITZER ET AL          2,729,189
                        BODY PAINTING MACHINE
Filed Oct. 28, 1950                              10 Sheets-Sheet 8
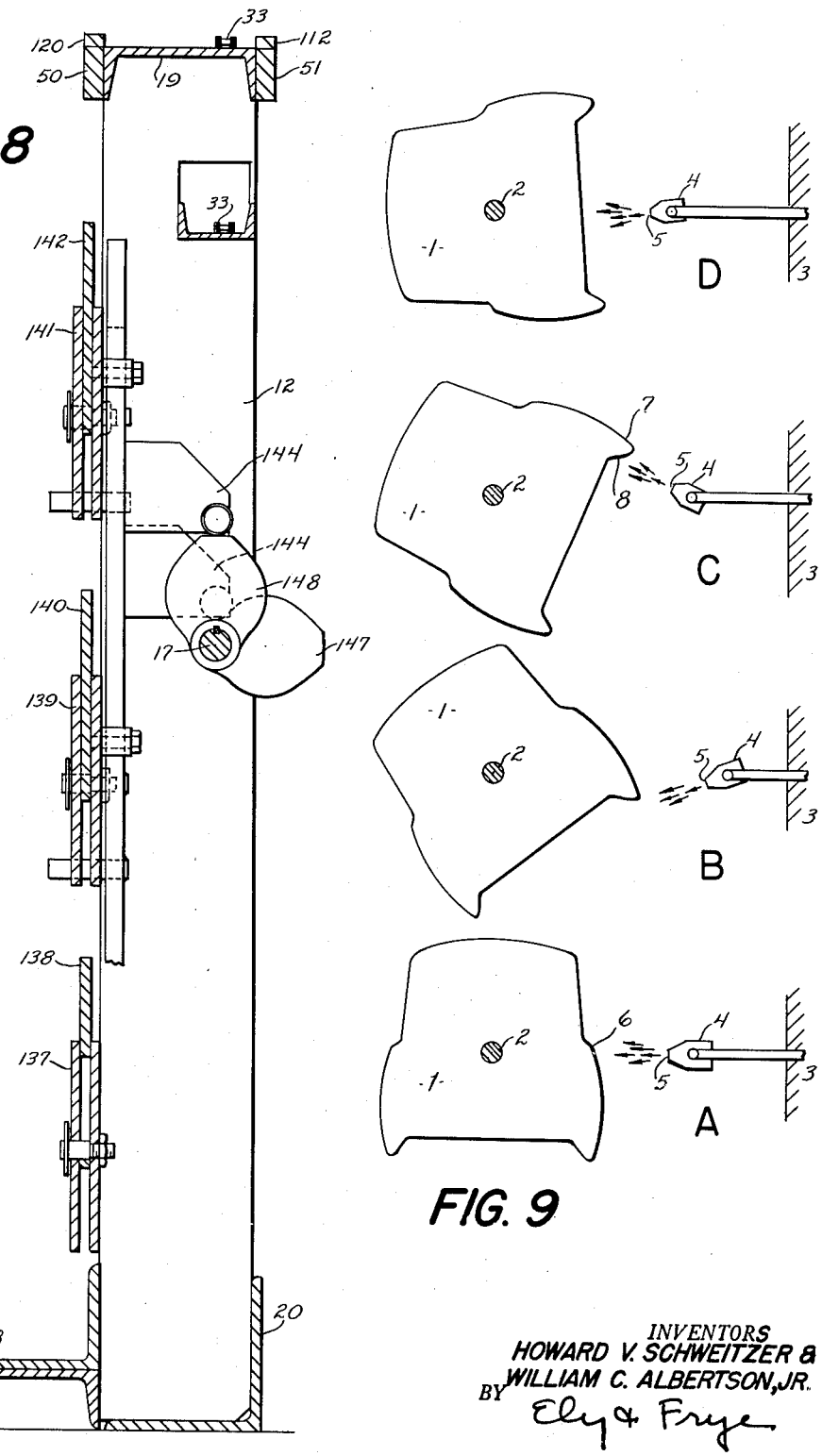
FIG. 8
FIG. 9
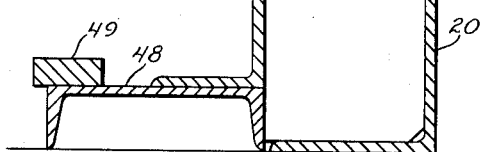
INVENTORS
HOWARD V. SCHWEITZER &
BY WILLIAM C. ALBERTSON, JR.
ATTORNEYS Jan. 3, 1956  H. V. SCHWEITZER ET AL  2,729,189
BODY PAINTING MACHINE
Filed Oct. 28, 1950  10 Sheets-Sheet 9

INVENTORS
HOWARD V. SCHWEITZER &
WILLIAM C. ALBERTSON, JR.
BY Ely & Frye
ATTORNEYS Jan. 3, 1956 H. V. SCHWEITZER ET AL 2,729,189
BODY PAINTING MACHINE
Filed Oct. 28, 1950 10 Sheets-Sheet 10
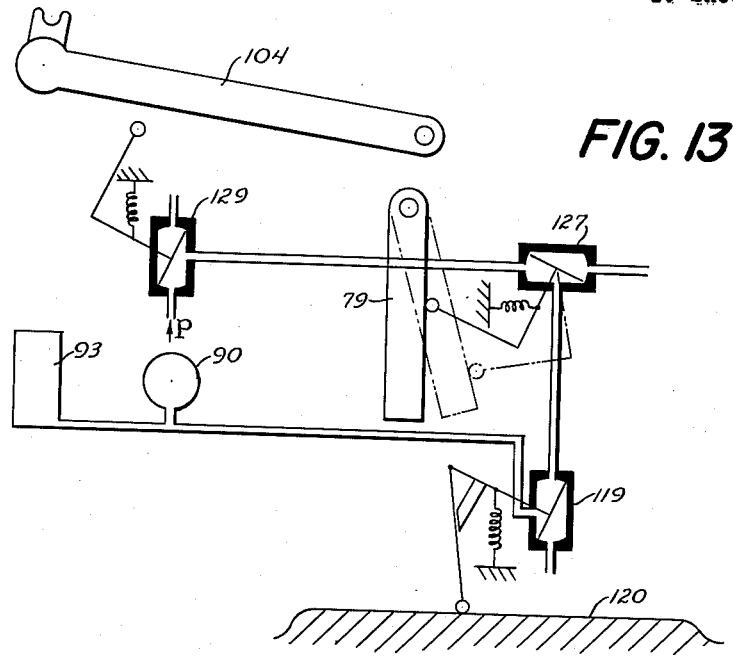
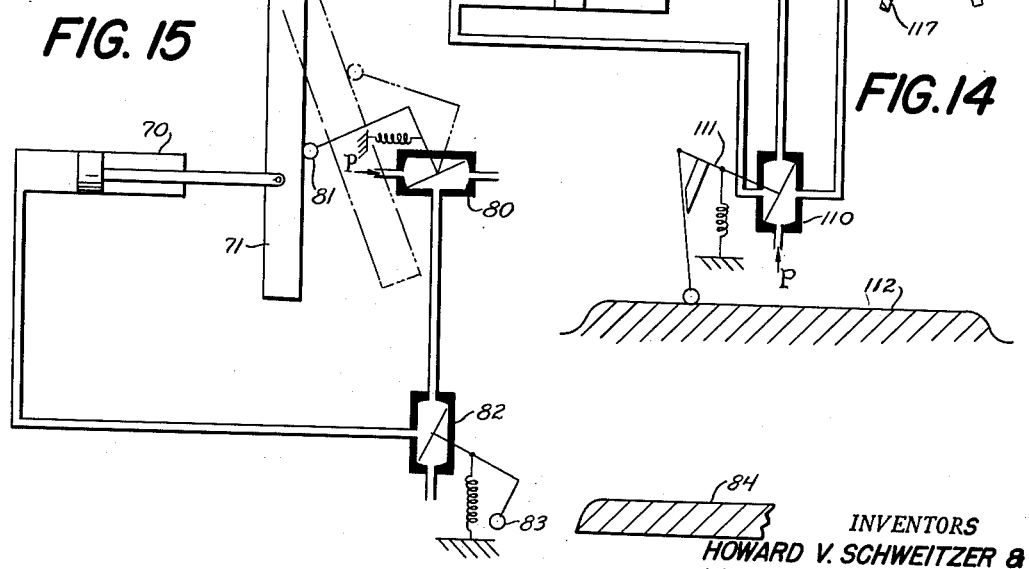
INVENTORS
HOWARD V. SCHWEITZER &
BY WILLIAM C. ALBERTSON, JR.
ATTORNEYS United States Patent Office 2,729,189
Patented Jan. 3, 1956

2,729,189

BODY PAINTING MACHINE

Howard V. Schweitzer, Shaker Heights, and William C. Albertson, Jr., Lakewood, Ohio; said Albertson, Jr., assignor to said Schweitzer Application October 28, 1950, Serial No. 192,644

10 Claims. (Cl. 118—6)

This invention relates to an improvement in painting machinery and, more particularly, to automatic machinery for painting the large irregular surfaces presented by vehicle bodies or any other irregular bodies as they are carried along a production line by a suitable conveyor. This application is a continuation-in-part of application Serial No. 184,464, filed September 12, 1950, now abandoned.

The present invention solves a problem that has for years been a challenge to manufacturers and especially to the automotive industry—namely, how to automatically, effectively and economically paint large highly irregular bodies on a production line basis and thereby obtain attendant savings in labor cost and increase in capacity. The invention contemplates covering the entire outside surface of a body such as a vehicle body by rotating the body about its longitudinal axis as it is slowly carried along an overhead conveyor on an assembly line past a relatively fixed paint gun. The paint gun is pointed in a general direction normal to the direction of movement of the conveyor so that the paint is applied to the body along a tight spiral path which just overlaps itself on each succeeding revolution of the body thereby "wrapping" the entire body in a continuous coat of paint.

Heretofore, the possibility of so "wrapping" a large body with a coating of paint has not occurred to those engaged in related arts, largely because of three complicating factors inherent in such an arrangement. In the first place, the surface of the vehicle or target body is very irregular and different portions of this surface are at different distances from the axis of rotation of the target body, so that as the target body rotates past a fixed gun, the distance from the gun to the target surface varies and the path of sprayed paint therefore also varies in width and the paint film varies in thickness. The present invention solves this problem by moving the paint gun in and out approximately along the direction in which it is aimed in order to keep the painted path of an approximately constant width and to eliminate one factor causing variation of paint film thickness. In the second place, at a constant speed of rotation of the target body about its own axis, the peripheral speed or speed at which a given portion of the target body surface passes the paint gun will vary with the distance of that portion of surface from the longitudinal axis of the target body. For a supply of paint under constant pressure the thickness of the paint film varies with the speed at which the target surface moves past the gun. Consequently, under ordinary circumstances, the further the target surface from the longitudinal axis of rotation of the target, the thinner the resulting paint film even though the distance from the gun to the target surface is maintained constant. Thirdly, re-entrant surfaces on the target body will not ordinarily receive their full share of exposure to the paint gun. The present invention overcomes these latter two difficulties by providing for an ingenious compensating traverse of the paint gun. Besides moving the paint gun in and out to keep it a constant distance from the target surface, the present invention contemplates causing the paint gun to occasionally sweep through an arc the axis of which is substantially parallel to (or at least not normal to) the longitudinal axis of the target. The gun is caused to sweep in such a manner that the speed differential between the gun nozzle and target area is maintained at an approach to a constant despite the varying peripheral speed of the various portions of the target surface. Furthermore, the gun traverse overcomes the problem posed by the re-entrant surfaces as will be explained below.

While the term "paint gun" is used throughout this introduction and parts of the specification for reasons of convenience, it is to be understood that an array of guns mounted to move together is used in the actual embodiment of the invention. The number of guns mounted to move together is, as will become clear, a matter of choice depending on, among other things, the width of the target area it is feasible to cover at one time.

A primary object of this invention is to provide an automatic machine which will apply to any desired portions of the outside surfaces of a large irregular body a substantially uniform coat of paint.

It is, therefore, an object of this invention to provide a machine which will revolve a vehicle body as it passes by on a conveyor, and simultaneously will move a gun in and out along a path having a component normal to the direction of travel of the vehicle body so as to maintain the gun at a substantially constant distance from the portion of surface being painted and which will also tilt the gun about an axis substantially parallel to the axis of rotation of the vehicle body to compensate for the effects of varying peripheral speeds and to take care of re-entrant surfaces not fully exposed to the gun in its straight ahead position.

Another primary object of the invention is to provide a method of painting the outside of an irregularly shaped body with a substantially uniform coat of paint.

Another object of this invention is to provide a machine which can be readily adapted by a selective control handle to successively automatically paint vehicle bodies having one of several shapes.

Still other objects and advantages of this invention will be apparent from the following specification, claims, and drawings of one embodiment of my invention.

In the drawings:

Figure 5 is a section, partly broken away, taken along line 5—5 in Figure 1.

Figure 5a is a view taken along line 5a—5a in Figure 5.

Figure 6 is a section taken along line 6—6 in Figure 1.

Figure 7 is a top view of the carriage taken along line 7—7 in Figure 1.

Figure 8 is a section taken along line 8—8 in Figure 3.

Figure 9 is a series of diagrammatic views illustrating certain principles of this invention.

Figure 12 is a detail view, partly in section, of a valve control arm showing the buckling arrangement whereby the arm is lifted only by a cam moving in one given direction.

Figure 13 is a schematic diagram illustrating the air valve arrangement for actuation of the booster drive.

Figure 14 is a schematic diagram illustrating the air valve arrangement for actuation of the spit engaging swinging arm.

Figure 15 is a schematic diagram illustrating the air valve arrangement for actuation of the brake which effects carriage return.

Theoretical explanation

Figure 1:
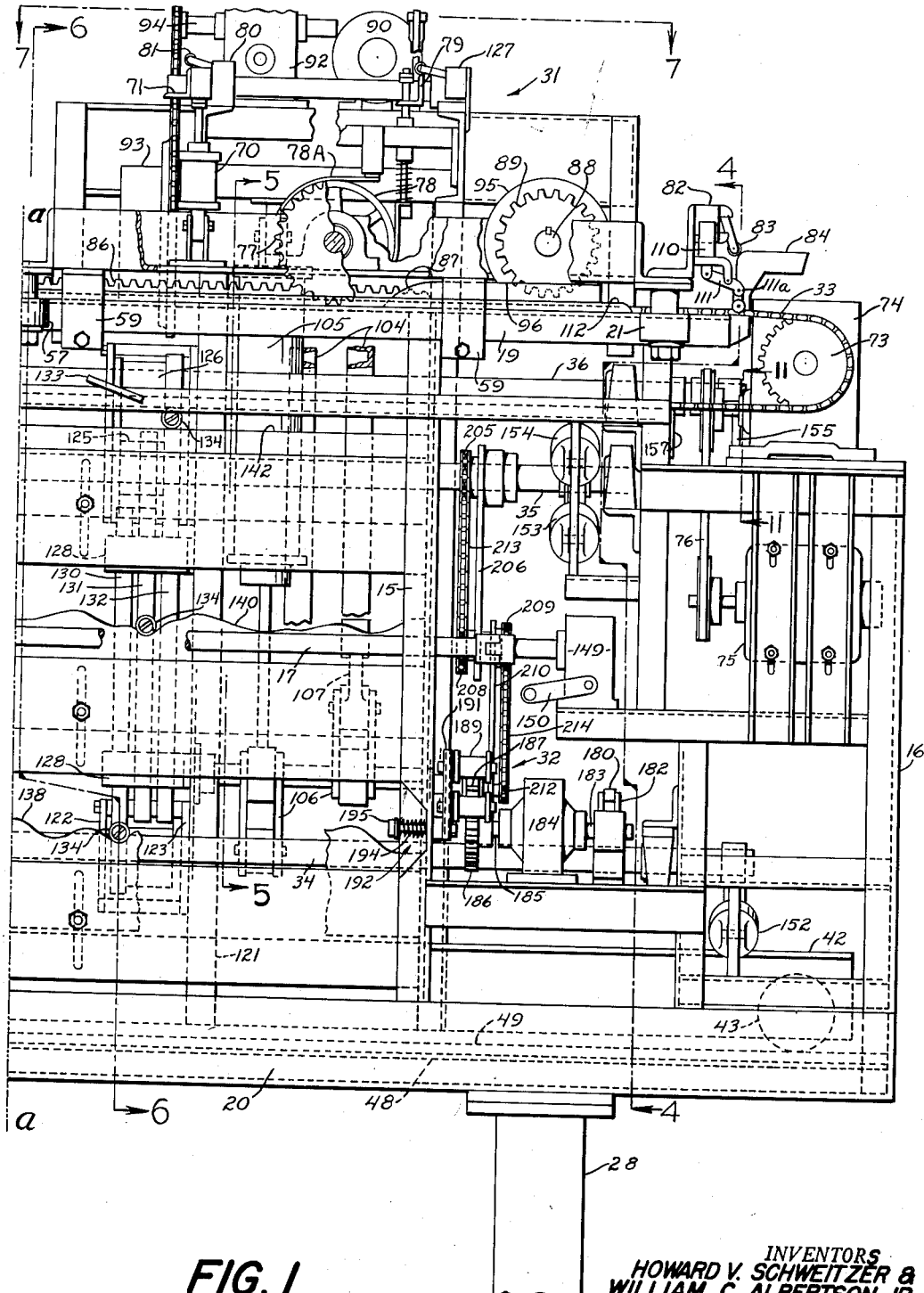
Figure 1 is a side elevation, partly in section, of one end of the body painter.

Figure 9 is a series of schematic end elevations of a vehicle body 1 mounted to rotate about axis 2 in a counterclockwise direction and at a constant speed. A fixed base 3 mounts a paint gun 4. The paint gun 4 is moved in and out on its fixed base so that the distance from gun nozzle 5 to vehicle body surface 6 remains substantially constant in the various rotative positions in order that the path of sprayed paint will not vary in width. It will be apparent that in position A the radial distance from the target surface to axis 2 is less than in position B so that the peripheral velocity of the target surface in position A is less than in position B. In other words, the speed differential between the nozzle of the gun and the target surface is greater at position B and this target surface is exposed to the gun for less time than is the target surface in position A. The speed differential in position B can be reduced, however, by rotating the gun in a clockwise direction at that position. Conversely, the speed differential in position A can be increased by rotating the gun in a counterclockwise direction at that position. The gun is therefore driven so that it is rotating clockwise when the high corners of the vehicle body are passing it, and counterclockwise when the low or inlying panel sections are passing it.

Position C represents the position as the re-entrant surface 8 passes the gun. The shoulder 7 tends to partially shield this surface 8 from the gun and thereby prevent surface 8 from receiving its full share of paint. However, the re-entrant shoulder occurs immediately after the high corner of which shoulder 7 forms a part. By turning the paint gun clockwise in order to give the high corner enough paint the gun is also aimed up into the re-entrant surface 8. The resulting dwell of the spray on the re-entrant surface insures that this surface will also receive its full share of paint.

One or more additional guns (not shown schematically) may be aimed along lines forming sharp angles with the illustrated paint gun, such angles lying in a plane extending parallel to the axis of rotation of the vehicle body. These additional guns may be turned on briefly at the very beginning or the very end of the painting cycle in order to spray the central end surfaces of the target body which would not be reached by a spray aimed radially inwardly. These central end surfaces are of relatively regular conformation and do not pose the special problems discussed above.

Thus it will be seen that as the target body turns past the gun a path of paint of substantially even thickness is sprayed on the body surface. Meanwhile, the body progresses axially at such a rate that on the succeeding revolution after a given target area has been sprayed the spray just marginally overlaps this given target area and the main spray is directed at a target area axially adjacent to the given area. The overall result is a substantially even coat of paint over the entire outside surface of the vehicle body, the thickness of which is much more uniform than has been heretofore attainable in production painting.

General structural organization

Figure 2:
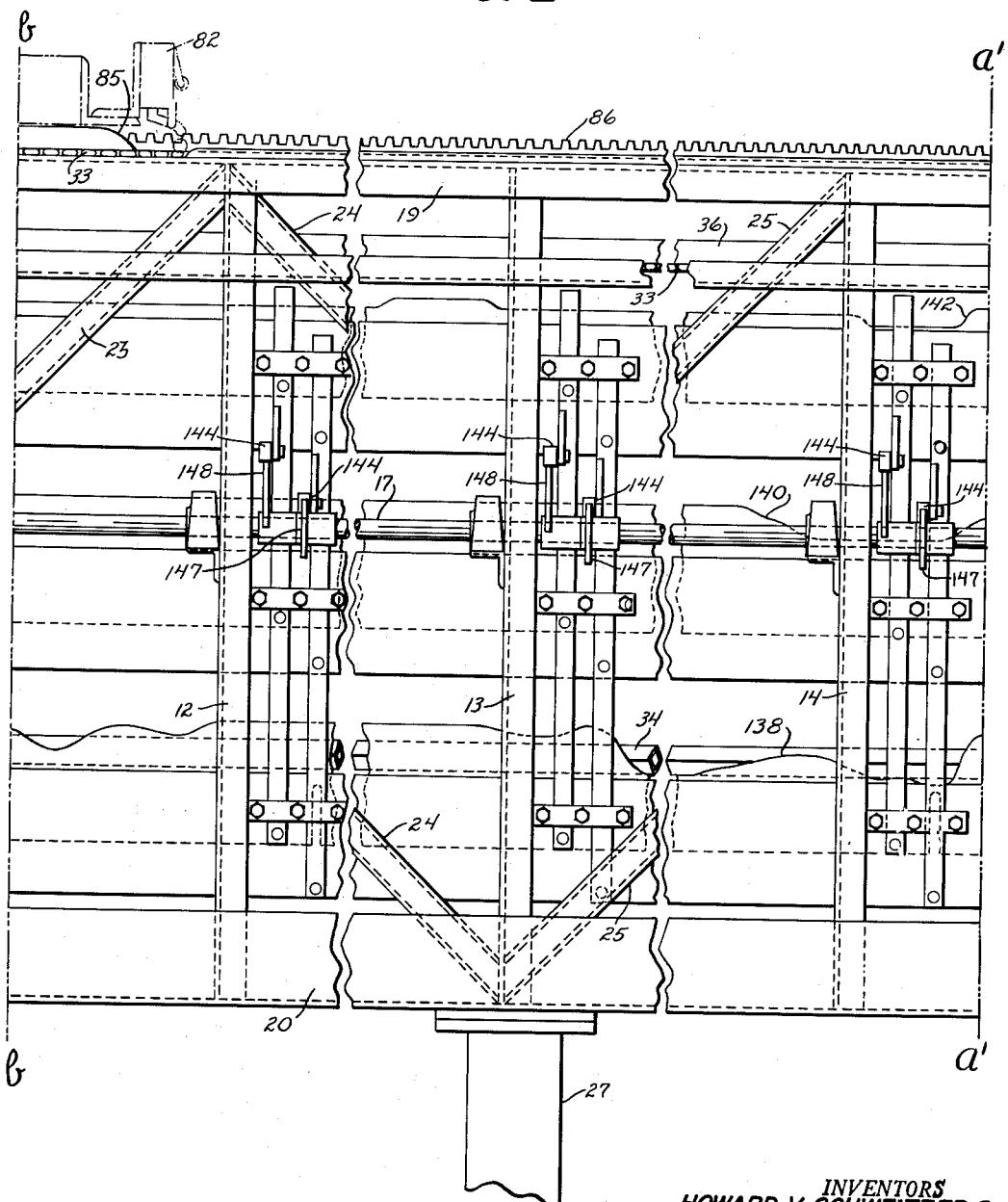
Figure 2 is a side elevation, partly in section and partly broken away, of the middle portion of the body painter.
Figure 3:
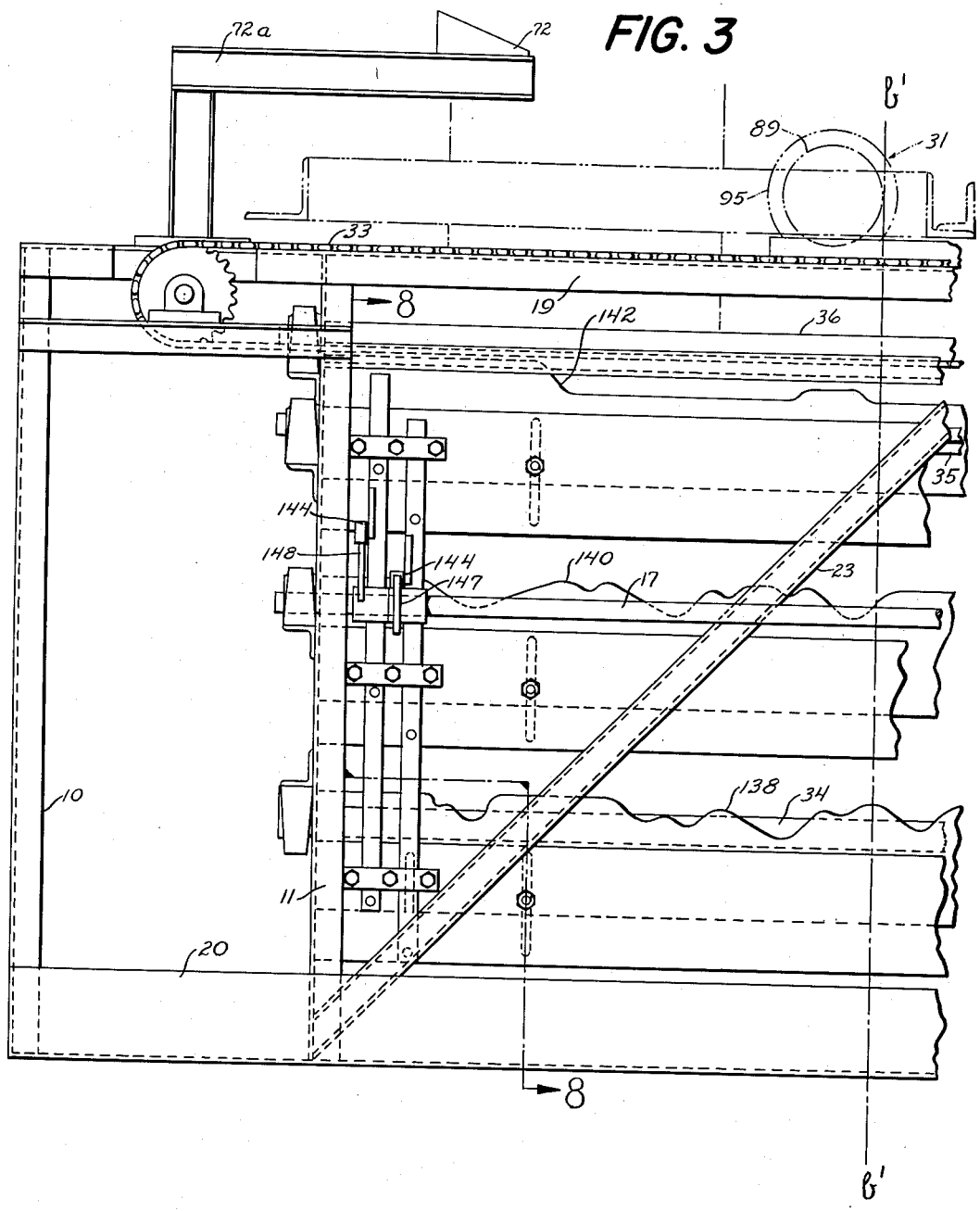
Figure 3 is a side elevation, partly in section, of the end of the body painter opposite to the end shown in Figure 1.

The general structural organization of the invention is best understood by an examination of Figures 1, 2 and 3. As viewed in these figures, the main structure is generally contained and supported in a frame comprising the columns 10, 11, 12, 13, 14, 15 and 16; the horizontal beams 19 and 20; and the diagonal bracers 23, 24 and 25. The lower horizontal beam 20 is supported by floor columns indicated at 27 and 28. An overhead conveyer is above and slightly behind the main structure of the body painter. A cradle 114 (see Figure 5) forms one of a series of cradles carried from right to left as viewed in Figures 1–3 by the overhead conveyer. Each of these cradles rotatably mounts a vehicle body to be painted so that, as any given vehicle body is carried from right to left by the conveyer, the body may be turned about an axis which is parallel to the direction along which the body is being transposed. Mounted for reciprocation along the body painter is a carriage 31. When a vehicle or target body approaches the body painter from the right the carriage 11 is engaged by the cradle 114 in a manner to be described in detail below. Carriage 31 is thereupon driven from right to left by the cradle 114, moving at the same speed as the conveyer throughout substantially the length of the body painter. On the carriage 31 is mounted a device, to be described in detail below, which engages the rotatable mounting of the vehicle or target body and causes the body to slowly turn on its longitudinal axis as it moves from right to left. It is during this turning that paint is applied by the paint gun. The gun is not seen distinctly in Figure 1 but its position is indicated at 32. As the vehicle or target body completes its movement past the paint gun, carriage 31 is disengaged from the conveyer bracket 30 and is returned from left to right by the chain 33 together with a clutching arrangement later to be described in detail.

Figure 4:
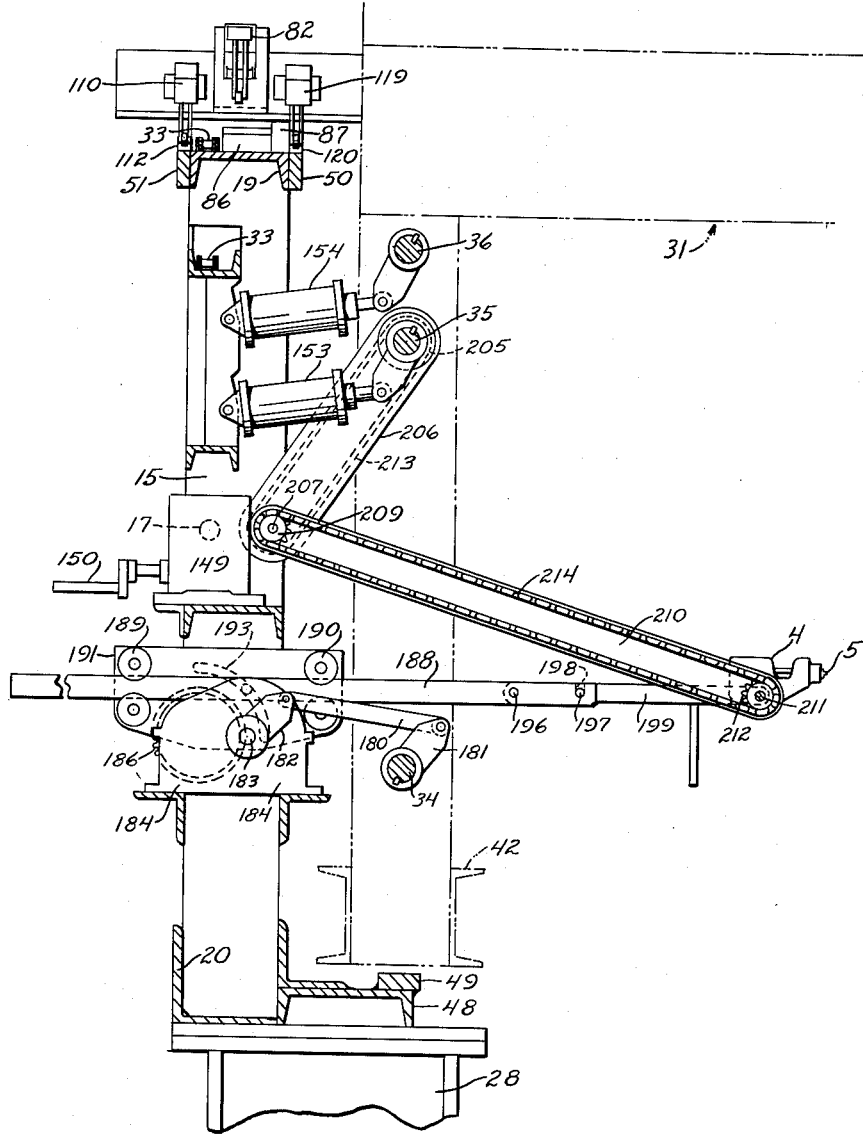
Figure 4 is a section taken along line 4—4 in Figure 1.
Figure 10:
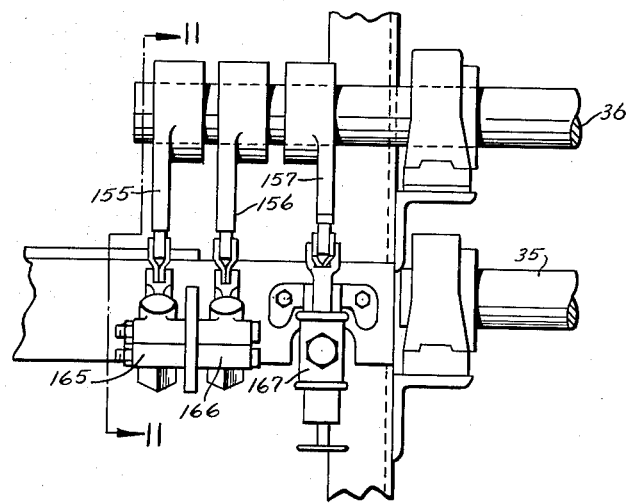
Figure 10 is a view taken along line 10—10 of Figure 11.

Located generally at the right end of the body painter (the right half of Figure 1) are the linkages and valves controlling the motions of the paint gun and the sequence of various operations. These linkages and valves are controlled, in turn, by the oscillation of three square shafts 34, 35 and 36 which extend substantially along the entire length of the body painter and around each of which slide cam following means carried by carriage 31. As each of these three cam following means slides from right to left along its associated square shaft it is caused to oscillate around the longitudinal axis of the associated square shaft by irregular cam surfaces on three pairs of relatively fixed cam plates which extend substantially along the entire length of the body painter and which are indicated in cross section in Figure 8, being labeled from 137 to 142. Since each cam following means and its associated square shaft are keyed together so as to permit longitudinal sliding but prevent relative rotation between the two, the conformation of each cam surface determines the oscillating motion of each square shaft in a manner more fully explained below and best illustrated in Figure 6. It is, of course, apparent that keying between each cam following means and its associated shaft could be obtained by suitably splining each cam following means and each associated shaft, or by other conventional keying arrangements. In the illustrated embodiment of the invention, however, the keying is obtained by using square shafts. The ends of these square shafts are round, as indicated in Figure 4, to permit them to oscillate or rotate in their bearings. The square shaft 36 controls the sequence of various operations including turning the paint gun on and off, the square shaft 35 controls the compensating traverse of the gun and the square shaft 34 controls the in and out motion of the gun. Another round shaft 17 is part of a linkage provided to enable a given set of cam plates to be selected according to the type of vehicle body approaching the machine, as will be more fully explained below.

Carriage drive and return

As is best seen in Figure 6, a horizontal beam 48 is also supported on floor columns 27 and 28. A flat rail 49 is welded on the top of this horizontal beam 48. Welded on the sides of the horizontal beam 19 (see also Figure 4) are a pair of flat rails 50 and 51. The carriage 31 is supported for reciprocation along the body painter structure by means of rollers which roll on rails 49, 50 and 51. Large roller 55 and small roller 56 roll on rail 50. Large roller 57 and small roller 58 (located behind plate 59 in Figure 1) roll on rail 51. Large roller 43 and small rollers 46 and 47 roll on rail 49. At the opposite end of the carriage are corresponding sets of rollers. In Figure 1, can be seen, for example, roller 21 which corresponds to roller 57.

Associated with each vehicle body carried past the body painter and in definite positional relationship to the associated vehicle body is any given part of the conveyer, for instance a cradle part 60 (see Figures 5 and 7) which has attached to it a rigid finger 61. Mounted for oscillation on carriage 31 is a shaft 62. Rigidly fastened to the shaft 62 it a notched plate 63 extending from which is an upwardly sloping camming tongue 64. As the part 60 is carried from right to left as viewed in Figure 7 the finger 61 engages the underside of camming tongue 64 and wedges it upward, causing the plate 63 to rise as shaft 62 turns in its mounting. As the finger 61 reaches notch 65 the plate 63 is free to fall back to its original position with the finger 61 gripped in notch 65. As the finger 61 continues to move to the left the carriage 31 is driven to the left along the tracks on the frame of the body painter.

Attached to the shaft 62 is a bell crank 66. Also mounted for oscillation on the carriage 31 is a shaft 69 having a bell crank 68 and a lever 71 attached thereto. Connecting the crank 66 and the crank 68 is the rod 67.

As the carriage 31 approaches the left end of the body painter a shoe attached to the lever 71 strikes a cam plate 72 attached to the body painter frame by a suitable bracket such as the cantilever 72a (see Figure 3). The lever 71 is thereupon forced upwards against the tension of attached spring 54 and, through the interconnecting bell crank and rod linkage, plate 63 is raised, releasing the finger 61.

The chain 33 is constantly driven clockwise by a sprocket 73 which is mounted on the output shaft of a speed reducer 74 which is in turn driven by electric motor 75 through belt 76 (see Figure 1). Rotatively mounted on the carriage 31 is a sprocket 77 with which rotates a brake wheel 78 about which is wrapped a brake band 78A having one end fixed and the other end attached by a suitable resilient coupling to an arm 79 fixed to the shaft 69 (see Figures 1 and 7). Operatively attached to the arm 71 is an air cylinder 70.

An air valve 80 is mounted on carriage 31 (see Figures 7 and 15). This air valve 80 has an actuating arm equipped with a roller follower 81 which is spring urged against lever 71. As the lever 71 is forced upwards by the cam plate 72 the valve 80 is thereby tripped to the dotted line position shown in Figure 15 to allow a supply of air under pressure, indicated by P, to pass through valve 80 to valve 82 (see Figures 1, 7 and 15). The valve 82 is normally open so that the air continues through this valve and into air cylinder 70 causing the piston rod associated therewith to extend and hold lever 71 in its raised position. Through the linkage 71, 69 and 79 the brake band 78A is thereby tightened and held in its tight or engaged position and the carriage 31 is clutched to the chain 33 for return to the right end of the body painter.

As the carriage 31 nears the end of its rightward movement, the roller 83 on the end of the actuating arm of valve 82 engages a fixed cam surface or stop 84 which closes valve 82, shutting off the supply of air under pressure from valve 80 and, at the same time, venting cylinder 70 to atmosphere through the bottom port of valve 82 as viewed in Figure 15. The arm 71 is thereupon urged to its lower position by the spring 54 and brake band 78A is disengaged causing the carriage 31 to come to rest in position for subsequent actuation by another finger 61 associated with the next successive vehicle body.

*Vehicle rotating drive and indexing means therefor*

Fixed to the beam 19 is a rack 86; rotatably carried by the carriage 31 is an axle 88 mounting a spur gear 89 adapted to engage the rack 86 and to be turned thereby as the carriage 31 is moved along tracks 49, 50 and 51.

Adjacent to and rising ramplike from the right end of the rack 86 is a camming surface 87. Adjacent to and rising ramplike from the left end of the rack 86 is a camming surface 85. Integral with the spur gear 89 is a camming shoulder 95 which has a flat face 96 adapted to slide on surface 85 or 87 and thereby lock the spur gear 89 against rotation. As viewed in Figure 1, as the gear 89 approaches the rack 86 flat face 96 slides along surface 87 until the downward slope of this surface allows a turning of the gear 89 just as it commences to mesh with the rack 86. Thus a positive indexing is attained which assures that gear 89 will begin rotation at exactly the same point on each successive reciprocation of the carriage 31. At the opposite end of the carriage's travel the surface 85 acts similarly to cause gear 89 to stop turning after a very precisely fixed amount of angular or rotative travel about its own axis.

Through the shaft 88, the bevel gears 97 and 98, a shaft 99 (see Figure 5), a sprocket 100, a chain 101, and a sprocket and gear 102 the spit mounting gear plate 103 is driven. Due to the accurate indexing of gear 89, the sprocket and gear 102 are always in an exactly fixed rotative position at the beginning of leftward carriage movement. The arm 104 which mounts the chain 101 and sprocket 102 can be swung about shaft 99 by an air cylinder 105 acting through a crank 106 and a link 107. The withdrawn position of the arm 104 is shown in phantom view in Figure 5. On its outer end the arm 104 carries a fork 108 adapted to engage a shaft 109 which is rotatively mounted on a cradle 114 hung from the overhead conveyer (not shown). The gear 103 is fixed to the shaft 109 along with a plate 115 to which is bolted the front end of a vehicle body to be painted. The rear end of the body is rotatably supported in a similar mounting. The gear 103 and plate 115 may be latched against rotation relative to cradle 114, this latch being released by the fork 108 as it slides into position.

Mounted on the side of the carriage 31 is an air valve 110 having a control arm 111 adapted to engage a cam ridge 112 and be held in the open position thereby. The cam ridge 112 runs longitudinally along the top of the frame parallel to the rack 86. Valve 110 controls the air supply to the cylinder 105 and is so positioned with respect to cam ridge 112 that, as carriage 31 begins leftward movement, valve 110 is tripped while flat face 86 and surface 87 are still cooperating to lock gear 89 against rotation. Thus, as arm 104 is swung outwards upon actuation of the cylinder 105, the sprocket 102 is in a definite rotative position. As the carriage continues to move to the left the gear 89 is caused to move through a definite number of turns by the rack 86, and is caused to stop at a definite point by the coaction of the flat face 86 and the surface 85. The movement of the gear 89 is so defined that sprocket 102 will cause the vehicle body carried by gear plate 103 to be locked in a perfectly upright position after having been rotated through a definite number of full turns. As this locking occurs the carriage 31 is still moving to the left. Before it reaches the end of its leftward movement the control arm 111 of the valve 110 rides down off the cam ridge 112 to cause the now non-rotating sprocket 102 to be carried back to withdrawn position by the arm 104 which is driven by the cylinder 105 which, in turn, is controlled by the valve 110. With the arm 104 in this withdrawn position the carriage is returned to the right end of the body painter frame as explained above. At the beginning of the return movement of the carriage 31 the arm 111 again engages the cam ridge 112. However, the arm 111 is designed to buckle at joint 111a when engaging the cam ridge 112 from this direction so that the valve 110 is not tripped during return movement of the carriage. This buckling arrangement of the arm 111 is illustrated in detail in Figure 12.

Shown in Figure 7 is an interlock lever 116. This lever is so positioned so that if there is a finger in the notch 65 the paddle 117 will be down. On the carriage 31 below this paddle is placed a valve arranged so that only when the paddle 117 is pressing down on it will this valve allow the air line from the air valve 110 to actuate the cylinder 105 to raise the arm 104. This interlock is simply a safety measure to make sure that the carriage 31 never effects its relatively rapid return (rightward) movement with the arm 104 in the extended position. The arrangement of air lines between the valves 110 and 118 and the double acting cylinder 105 are shown schematically in Figure 14. The source of air under pressure is again indicated by P. It will be apparent upon examination of this diagram that the piston rod associated with the cylinder 105 will be urged in the extended direction only if both valves are in the position shown. If the position of either or both valves is reversed, the piston rod will be withdrawn under pressure to quickly raise the arm 104.

*Carriage driving and vehicle rotating booster*

Mounted on the carriage 31 is an air motor 90 which through a chain 91 drives a speed reducer 92. An air clutch 93 is driven by the output shaft 94 of the speed reducer 92. Shortly after the gear 89 begins to turn upon leftward movement of the carriage 31 a valve 119 located near valve 110 is tripped by a cam ridge 120 similar to and parallel to the cam ridge 112 to actuate the air motor 90 and air clutch 93 and thereby apply torque to shaft 99 which is driven by the output side of the air clutch. It has been found advantageous to choose a torque output of the air motor 90 high enough so that the booster actually causes gear 89 to drive the carriage by the traction of this gear on rack 86. The finger 61, although it is moved in a leftward direction by the conveyor, actually acts as a brake when the booster is on. With this arrangement the carriage drive and vehicle body rotation is not dependent on power furnished by the conveyor and thereby avoids heavy loading and distortion of the carriage assembly. Furthermore, slack or backlash in the conveyor will not affect the body painter since the booster takes up all backlash and accurate indexing is maintained by the gear 89, rack 86, face 96 and surface 87. Shortly before the gear 89 stops turning near the termination of the leftward movement of the carriage 31, the valve 119 controlling the air motor 90 and air clutch 93 is released by its associated cam ridge 120 and the booster drive is thereby disconnected. This valve is prevented from operating during return movement of the carriage 31 by a buckling arm arrangement identical to that of the valve 110 and arm 111.

Mounted on the carriage 31 for actuation by the arm 79 is an air valve 127 (see Figures 7 and 13). Also mounted on the carriage 31 for actuation by the swinging arm 104 is another valve 129 (see Figures 5 and 13). The arrangement of the air lines between valves 119, 127 and 129, air motor 90 and air clutch 93 is shown diagrammatically in Figure 13, the source of air under pressure once again being indicated by P. An examination of Figure 13 will make it apparent that the motor 90 and clutch 93 can only be actuated by the valve 119 if the swinging arm 104 is in its raised position and the arm 79 is in its lower or horizontal position.

*Carriage carried cam followers and frame carried cams*

As may be most clearly seen in Figure 6, a segment nut 124 slidably receives the square shaft 34. This nut 124 is carried on vertical beam 121 of the carriage 31 by means of restraining plates 122 and 123 (see Figure 1). Similarly carried on beam 121 are the segment nuts 125 and 126. Also carried on beam 121 by brackets 128 are the racks 130, 131, and 132 which are free to move up and down vertically relatively to the beam 121. Fixed to each of these racks is a cam follower such as 134.

Longitudinally extending along the painter frame are cam plates 137, 138, 139, 140, 141 and 142. Each cam plate has attached to it a number of lifters 144. The shaft 17 has attached thereto angularly displaced sets of lifting cams 147, 148 (see Figure 8). The lifting cams and lifters are arranged so that all the lifters attached to the cam plates 137, 139 and 141 are engaged simultaneously by lifting cams 147 or, alternatively, all the lifters attached to the cam plates 138, 140 and 142 are engaged simultaneously by the lifting cams 148. The shaft 17 is driven through a speed reducer 149 by a crank 150. Alternate sets of cam plates can thus be selected, depending on the type of vehicle body to be painted, by rotating the crank 150. It will be apparent that more than two alternate sets of cam plates may be provided.

As the carriage 31 moves leftward the cam followers 134 each follow the top irregular surface of the associated raised cam plate. As shown in Figures 1, 2, 3, 6 and 8, cam plates 138, 140 and 142 are in raised operative position. The cam followers are urged toward the associated cam plates by the nut segments which in turn are urged clockwise as viewed in Figure 6 by their associated square shafts 34, 35 and 36. These square shafts are urged to rotate by double acting air cylinders 152, 153 and 154 (see Figures 1 and 4) acting in what will hereafter be referred to as the "followers down" direction.

The surfaces of top cam plates 141 and 142 are irregular, as are the surfaces of the other cam plates. However, these top cam plate surfaces are always on one of four different horizontal levels except for relatively abrupt curved surfaces joining one horizontal level with the other. From the bottom to the top level represents, of course, from number one position to number four position of the square shaft 36.

Mounted at the end of the shaft 36 are three rotary cams 155, 156 and 157. Cam 155 actuates normally closed valve 165, cam 156 actuates normally closed valve 166 and cam 157 actuates a four way valve 167 similar to valves 110 and 118. Valves 165 and 166 each turn on and off the air supply to an associated group of paint guns. A port from the first side of the valve 167 is connected to the "followers up" side of each of the air cylinders 152, 153 and 154, while a port from the second side of this valve is connected to the "followers down" side of each of these cylinders. Upon actuation of the valve 167 by the cam 157 the pressure port of this valve is connected to the port from the first side and the exhaust port is connected to the port from the second side. Upon release of the valve 167 by the cam 157, the converse obtains.

Figure 11:
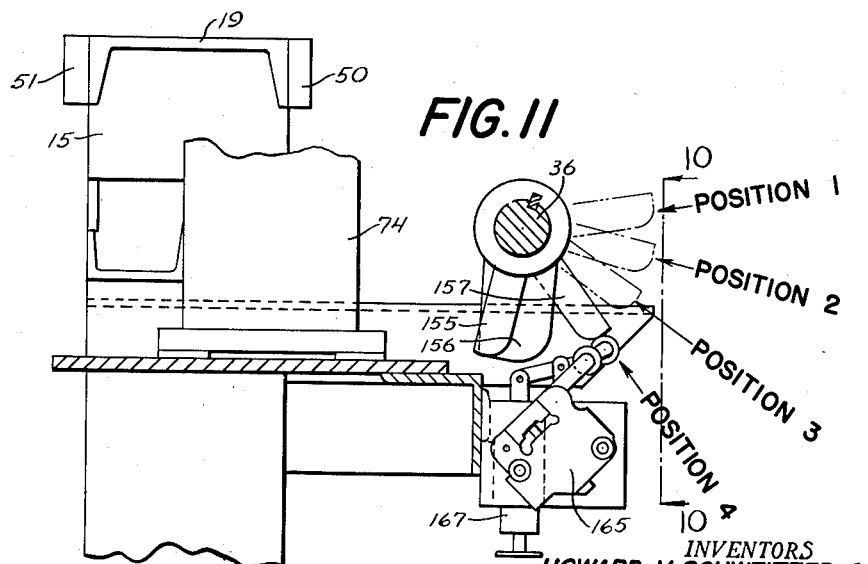
Figure 11 is a section taken along line 11—11 of Figures 1 and 10, certain parts being omitted for clarity.

It will be seen from an examination of Figure 11 that the four angular positions of shaft 36 simply actuate the valves 165, 166 and 167 in four different combinations. Thus, in number one position all paint guns are on and air cylinders 152, 153 and 154 are acting in the "followers down" direction. In number two position certain paint guns are off while others remain on and the air cylinders act in the "followers down" direction. In position three all guns are off but the air cylinders still act in the "followers down" direction. In position four all guns are off and the air cylinders act in the "followers lifted" direction. As the carriage moves from left to right the sequence of these positions due to the conformation of the top of the cam plates 141 and 142 is: position three, position one, positions two and three alternately, and finally position four. The square shaft 36 assumes position 4 near the end of the leftward movement of the carriage 31. Since cylinders 152, 153 and 154 then all act in the "followers lifted" direction, all the followers 134 are lifted from all the cam plates to clear the carriage 31 for free return movement from left to right, but since they are all lifted the cam plate 141 or 142 cannot effect re-engagement of the associated follower 134. This re-engagement is effected by having the follower 134 associated with square shaft 36 strike a suitable longitudinally extending downwardly sloping fixed abutment 133 as the carriage 31 reaches its rightmost position. The square shaft 36 is thereupon forced back from number four to number three position and, as cylinders 152, 153 and 154 are accordingly actuated, all the cam followers 134 snap down to their cam following position.

*Gun in and out linkage*

As above stated, the in and out motion of the paint gun is controlled by square shaft 34. The linkage driven by this shaft is most clearly seen in Figure 4. A link 180 connects the crank arm 181 mounted on the rounded end of shaft 34 with the crank arm 182 mounted on the input shaft 183 of a motion multiplier gear train enclosed in housing 184. Mounted on the output shaft 185 (see Figure 1) of this multiplier gear train is a spur gear 186 which is in meshing engagement with a rack 187. The rack 187 forms part of a reciprocating bar 188 carried between the pairs of rollers 189 and 190. The rollers are mounted on a plate 191 which is pivotally secured to the frame by a pivot co-axial with output shaft 185. The plate 191 is held against rotation about this pivot by a spring loaded detent, indicated at 192, which extends through an arcuate slot 193 in the plate 191 and frictionally bears against the right side of the plate 191 as it is viewed in Figure 4. As is clearly seen in Figure 4, the detent is in the form of a bolt, and tension of the spring 194 is adjusted by turning the nut 195. This friction detent arrangement allows the arm, roller and plate assembly to rotate about the pivotal connection between plate 191 and the frame should any moving object strike the paint gun or the end of bar 188 and tend to force it up or down. As a further precaution the pivot 196, pin 197 and slot 198 are provided so that the outer gun mounting arm 199 can swing up under load about pivot 196, although it is ordinarily held in horizontal position by integral pin 197 which seats in slot 198 formed in bar 188.

As previously mentioned in the above discussion of the carriage carried cam followers, the air cylinder 152 acts in the "followers lifted" direction near the end of the leftward movement of the carriage 31. It will be apparent that, when acting in this direction, the air cylinder 152 urges the shaft 34 to turn in the clockwise direction as viewed in Figure 4, thus driving the gun in and out linkage to retract the gun mounting arm 199 to its leftmost position as viewed in this figure. The guns are therefore in their retracted position during return or rightward movement of the carriage 131.

One or several guns are mounted at the end of 199; for convenience only one is shown in Figure 4. It will be apparent that, through inclusion of the motion multiplier in the linkage, relatively small angular movement of shaft 34 will result in a relatively long stroke of the bar 188 together with the gun.

*Gun traverse linkage*

The linkage between the shaft 35 and the gun is best understood from an examination of Figures 1 and 4. As stated above, this linkage is designed to effect traversing motion of the gun upon angular movement of the shaft 35. Mounted for rotation with the shaft 35 is a sprocket 205. Rotatably mounted on the shaft 35 is an arm 206. Journalled in the opposite end of the arm 206 is a hub 207. Secured to one end of the hub 207 is a sprocket 208, while a sprocket 209 is secured to the opposite end of this hub. Rotatably mounted on the hub is a second arm 210, the other end of which is pivotally secured to a shaft 211 which is secured to the arm 199. A sprocket 212 is rotatably mounted on the shaft 211 independently of the arm 210. The gun is also pivoted about shaft 211 and rotates with the sprocket 212. A chain 213 passes around the sprockets 205 and 208. Another chain 214 passes around the sprockets 209 and 212. By this arrangement the gun duplicates the angular movement of the shaft 35 and yet is free to be displaced in any direction in a plane which is normal to the axis of the shaft 35. Therefore, even though the gun is moved in and out by the bar 188, it is locked against rotation unless shaft 35 turns since the shaft 35 locks sprocket 205 against rotation which in turn locks chain 206, sprocket 208, sprocket 209, chain 214 and sprocket 212. Rotation of the shaft 35 through a given angle causes all the sprockets and the paint gun to rotate through the same angle.

*Operation*

It will be helpful to an understanding of this invention to run through a complete cycle of operation of the body painter from the time one vehicle body approaches the painter until the painter is in position awaiting the succeeding vehicle body. As a vehicle body approaches the painter, carriage 31 is in its rightmost position as viewed in Figures 1, 2, 3 and 7. The square shaft 36 is in its No. 3 position, that is, all paint guns are off but the cylinders 152, 153 and 154 are acting in the "followers down" direction. Arms 71 and 79 are horizontal so that the valve 127 is open and the valve 80 is closed. Finger 61 forces up the plate 63 and is engaged by notch 65 thereupon starting to drive the carriage 31 to the left and lowering the paddle 117 to trip the valve 118. Shortly thereafter, the valve 110 is tripped by the cam ridge 112 causing the arm 104 to swing out so that sprocket 102 engages gear 103. As the arm 104 swings out the valve 129 opens. As the carriage continues to move to the left, face 96 on gear 89 rides down the sloped left end of surface 87 and the gear 89 engages the rack 86. Through the train from this gear 89 to sprocket 102, the vehicle body is caused to start turning. Shortly thereafter the valve 119 is tripped by the cam ridge 120 to actuate the air clutch 93 and booster air motor 90, thereupon taking up any slack in the conveyor and tending to drive the carriage by torque exerted back through the associated mechanical train to gear 89 which acts as a traction wheel on the rack 86.

During all these operations, the cam follower 134 associated with the square shaft 36 has been held in position 3 by the conformation of whichever of cam plates 141 or 142 it is engaged with. After the booster takes over and as the body comes into proper position before the paint gun, this cam follower follows the associated cam plate down to the lowest horizontal level, putting square shaft 36 in position 1 with all paint guns on. In this position paint guns which are pointed angularly away from a radial line from the center of rotation of the vehicle body act to spray the end surface of the vehicle body. In a very short time the square shaft 36 is moved to position 2 shutting off these angularly directed guns but allowing the remaining paint guns to operate. As the vehicle body progresses and turns, there may be openings such as windows or luggage spaces encountered, on or through which paint is not to be sprayed. At these times the square shaft 36 is caused to shift from position 2 to position 3. In this latter position all paint guns are off but the cylinders 152, 153 and 154 are acting in "follower down" direction. During this part of the painting process the remaining plates 137 and 139 or 138 and 140 are controlling, respectively, the in-and-out motion of the paint guns and the traversing motion of the paint guns as has been fully explained above.

As the vehicle body nears the end of its progress past the paint guns, the cycle of operations is generally reversed. Square shaft 36 is raised to number 4 position shutting off all paint guns and causing all cam followers 134 to snap up to lifted position and also retracting the gun mounting arm 199. Thereupon valve 119 controlling the air clutch 93 and the associated booster drive is caused to close by the termination of its associated cam ridge 120. Shortly thereafter the gear 89 reaches the end of the rack 86 and its face 96 rotates up on surface 85 locking the associated drive train and the vehicle body against rotation. Thereupon valve 110 is reversed by the termination of cam ridge 112 causing the air cylinder 105 to retract the arm 104. After this occurs, the lever 71 on the carriage 31 strikes the cam plate 72 to disengage the finger 61 from the notch 65 and open the valve 80. Valve 82 is already open so that the cylinder 70 is actuated to hold the brakeband 78A tightly against the brake wheel 78 thus coupling the carriage 31 with the clockwise rotating chain 33. The chain carries the carriage to the right and as the carriage approaches its right-most position, the cam follower 134 associated with the square shaft 36 strikes the downwardly sloping fixed abutment 133 forcing the square shaft 36 back from number 4 to number 3 position causing all the cam followers 134 to snap to the cam following position. At the end of its rightward motion the carriage 31 is disengaged from the chain 33 by the tripping of the valve 82 controlling air cylinder 70 by the fixed abutment or cam 84. All the parts are now in position for reception of a succeeding vehicle body.

From an examination of this specification it will be apparent that the scope of this invention is not confined to the specific embodiment disclosed above, but is limited solely by the following claims.

What is claimed is:

1. In combination with a conveyor carrying a series of spit mountings each adapted to rotatably support a target body for rotation about an axis parallel to the direction of said conveyor, a fixed frame, a carriage reciprocable on said frame along a path parallel to said direction, means carried by said conveyor in association with each of said target bodies to engage said carriage to drive it in said direction, cooperating means on said frame to drive said carriage opposite to said direction, target turning means carried by said carriage to successively engage and turn said spit mounting during movement of said carriage in said direction, and paint spraying means carried by said frame and aimed toward the path of travel of said target bodies.

2. The combination of claim 1 in which said target turning means includes target rotation indexing means, said indexing means comprising a spur gear having an axially extending smooth shoulder with a flat chordal surface cut therein, a rack carried by said frame, camming surfaces adjacent both ends of said rack, each of said surfaces rising ramplike just before the adjacent end of said rack and extending horizontally beyond said rack, said chordal surface sliding on one of said camming surfaces until said spur gear engages said rack and sliding on the other of said camming surfaces when said spur gear disengages said rack.

3. In combination with a conveyor carrying a series of spit mountings each adapted to rotatably support a target body for rotation about an axis parallel to the direction along which it is longitudinally transposed by said conveyor, a fixed frame, a carriage reciprocable on said frame, a longitudinally fixed paint gun carried in said frame, first linkage means carried by said frame to move said paint gun toward and away from the surface of a passing target body, second linkage means carried by said frame to traverse said paint gun about an axis parallel to the axis about which said target body is rotated, first cam means carried by said frame and first cam follower means carried by said carriage to control said first linkage means, second cam means carried by said frame and second cam follower means carried by said carriage to control said second linkage means.

4. A device as defined in claim 3 in which said first cam means and said second cam means each comprise a plurality of cam plates, means to selectively put in position any one of each plurality of cam plates for engagement with said first cam followr means and said second cam follower means respectively.

5. In a body painter, means to rotate a target body, paint spraying means aimed at the surface of said body, reciprocating means to maintain said paint spraying means at a substantially constant distance from said body, means to traverse said paint spraying means, valve means to turn said paint spraying means on and off, a trio of fixed cams, a carriage traveling alternately in a first direction and a second direction, a trio of cam followers carried by said carriage, means whereby the first of said cam followers drives said reciprocating means while said carriage travels in said first direction, means whereby the second of said cam followers drives said means to traverse while said carriage travels in said first direction, means whereby the third of said cam followers drives said valve means while said carriage travels in said first direction, and means lifting said trio of cam followers from said trio of cams while said carriage travels in said second direction.

6. A device as defined in claim 5 in which said means lifting said trio of cam followers comprise double acting air cylinders each of which yieldingly urges its associated cam follower against its corresponding cam while said carriage moves in said first direction and each of which urges its associated cam follower away from its corresponding cam while said carriage travels in said second direction.

7. In combination with a conveyor carrying a series of spit mountings each adapted to rotatably support a target body for rotation about an axis parallel to the direction of said conveyor, a fixed frame, a carriage reciprocable on said frame along a path parallel to said direction, means carried by said conveyor in association with each of said target bodies to engage said carriage to drive it in said direction, cooperating means on said carriage and said frame to drive said carriage opposite to said direction, target turning means carried by said carriage to successively engage and turn said spit mountings during movement of said carriage in said direction, said target turning means including target rotation indexing means, paint spraying means carried by said frame, reciprocating means to maintain said paint spraying means at a substantially constant distance from the surfaces of passing target bodies, means to traverse said paint spraying means to maintain substantially constant the velocity at which said body surfaces move past said paint spraying means, valve means to automatically turn said paint spraying means on and off as predetermined areas of said target bodies are exposed to said paint spraying means, a trio of fixed cams, a trio of cam followers carried by said carriage, means whereby the first of said cam followers drives said reciprocating means, means whereby the second of said cam followers drives said means to traverse, means whereby the third of said cam followers drives said valve means, and means periodically lifting said trio of cam followers from said trio of cams.

8. A device as defined in claim 7 in which each of said trio of fixed cams comprises a plurality of cam plates, and means to selectively put in position any one of each plurality of cam plates for engagement with said first cam follower, said second cam follower and said third cam follower, respectively.

9. In combination with a conveyor carrying a series of spit mountings each adapted to rotatably support a target body for rotation about an axis parallel to the direction of said conveyor, a fixed frame, a carriage reciprocable on said frame along a path parallel to said direction, means carried by said conveyor in association with each of said target bodies to engage said carriage and to constrain said carriage to move in said direction, cooperating means on said carriage and said frame to drive said carriage opposite to said direction, target turning means carried by said carriage to successively engage and turn said spit mounting during movement of said carriage in said direction, paint spraying means carried by said frame and aimed toward the path of travel of said target bodies, and booster drive means to furnish the power to drive said target turning means and to furnish the power to move said carriage in said direction.

10. In a body painter, means to rotate an irregularly shaped target body about an axis, means to transpose said body longitudinally along said axis past a station, paint spraying means at said station aimed toward the path described by said body, linkage means moving said paint spraying means to cause sprayed paint to coat said body to a substantially even thickness, said linkage means comprising means to maintain said paint spraying means at a substantially constant distance from said target body and restraining said paint spraying means against motion in a direction parallel to said axis.

References Cited in the file of this patent

UNITED STATES PATENTS

| | | |
|---|---|---|
| 2,321,983 | Brackett | June 15, 1943 |
| 2,330,124 | James | Sept. 21, 1943 |
| 2,345,834 | Schweitzer | Apr. 4, 1944 |
| 2,383,503 | Landis et al | Aug. 28, 1945 |
| 2,598,246 | Fowler | May 27, 1952 |

FOREIGN PATENTS

| | | |
|---|---|---|
| 320,664 | Great Britain | Oct. 21, 1929 |